US012677341B2

(12) United States Patent
Turtinen et al.

(10) Patent No.: US 12,677,341 B2
(45) Date of Patent: Jul. 7, 2026

(54) DATA HANDLING DURING SDT

(71) Applicant: Nokia Technologies Oy, Espoo (FI)

(72) Inventors: Samuli Heikki Turtinen, Oulu (FI);
Jussi-Pekka Koskinen, Oulu (FI);
Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 404 days.

(21) Appl. No.: 18/572,755

(22) PCT Filed: Jun. 22, 2021

(86) PCT No.: PCT/CN2021/101579
§ 371 (c)(1),
(2) Date: Dec. 20, 2023

(87) PCT Pub. No.: WO2022/266848
PCT Pub. Date: Dec. 29, 2022

(65) Prior Publication Data
US 2024/0292482 A1 Aug. 29, 2024

(51) Int. Cl.
| | |
|---|---|
| *H04W 4/00* | (2018.01) |
| *H04W 12/106* | (2021.01) |
| *H04W 76/20* | (2018.01) |
| *H04W 74/0833* | (2024.01) |
| *H04W 74/0836* | (2024.01) |

(52) U.S. Cl.
CPC ......... *H04W 76/20* (2018.02); *H04W 12/106* (2021.01); *H04W 74/0833* (2013.01); *H04W 74/0836* (2024.01)

(58) Field of Classification Search
CPC ... H04W 76/20; H04W 12/106; H04W 76/27; H04W 74/0833
See application file for complete search history.

(56) References Cited

U.S. PATENT DOCUMENTS

| | | | | |
|---|---|---|---|---|
| 11,363,485 B2 * | 6/2022 | Lee | ......................... | H04L 47/34 |
| 11,991,556 B2 * | 5/2024 | Lu | ......................... | H04W 28/06 |
| 2009/0286541 A1 * | 11/2009 | Maheshwari | ......... | H04W 76/10 |
| | | | | 455/436 |
| 2018/0227962 A1 | 8/2018 | Mallick et al. | | |
| 2021/0105674 A1 * | 4/2021 | Kim | ................. | H04W 74/0833 |

(Continued)

FOREIGN PATENT DOCUMENTS

| | | |
|---|---|---|
| CN | 101778420 A | 7/2010 |
| CN | 112913315 A | 6/2021 |
| EP | 2683183 A1 | 1/2014 |

OTHER PUBLICATIONS

"Work Item on NR smalldata transmissions in INACTIVE state", 3GPP TSG RAN Meeting #86, RP-193252, Agenda Item: 9.1.2, ZTE Corporation, Dec. 9-12, 2019, 4 pages.

(Continued)

*Primary Examiner* — Abdelnabi O Musa
(74) *Attorney, Agent, or Firm* — Barta Jones, PLLC

(57) ABSTRACT
Embodiments of the present disclosure relate to handling data during SDT. A first device in an inactive state performs an initial transmission to a second device during an SDT. The first device receives, from the second device, data subsequent to the initial transmission during the SDT. The first device buffers the data. The first device handles the buffered data in accordance with a determination that security verification is successful.

11 Claims, 5 Drawing Sheets

(56) References Cited

U.S. PATENT DOCUMENTS

| | | | | |
|---|---|---|---|---|
| 2021/0329712 | A1* | 10/2021 | Pham Van | H04W 12/106 |
| 2022/0167239 | A1* | 5/2022 | Kim | H04W 36/185 |
| 2022/0174771 | A1* | 6/2022 | Baek | H04W 76/15 |
| 2023/0075613 | A1* | 3/2023 | Xu | H04L 1/0045 |
| 2024/0056907 | A1* | 2/2024 | Wu | H04W 36/0064 |
| 2024/0196186 | A1* | 6/2024 | Fujishiro | H04W 40/34 |
| 2024/0381443 | A1* | 11/2024 | Kim | H04W 36/185 |
| 2025/0133625 | A1* | 4/2025 | Kim | H04W 12/041 |

OTHER PUBLICATIONS

Msc-generator, Sourceforge, Retrieved on Mar. 13, 2024, Webpage available at : https://sourceforge.net/projects/msc-generator/.

3rd Generation Partnership Project; Technical Specification Group Radio Access Network; NR; Radio Resource Control (RRC) protocol specification (Release 16), 3GPP TS 38.331, V16.4.1, Mar. 2021, pp. 1-949.

3rd Generation Partnership Project; Technical Specification Group Radio Access Network; NR; Medium Access Control (MAC) protocol specification (Release 16), 3GPP TS 38.321, V16.4.0, Mar. 2021, pp. 1-157.

"Report for Rel-16 (NR-U, Power Savings and 2-step RACH) and Rel-17 (IIoT and Small Data)", 3GPP TSG-RAN WG2 Meeting #111-e, R2-2008124, InterDigital, Aug. 17-28, 2020, pp. 1-25.

IEEE 802.11, Wikipedia, Retrieved on Mar. 11, 2024, Webpage available at : https://en.wikipedia.org/wiki/IEEE_802.11.

International Search Report and Written Opinion received for corresponding Patent Cooperation Treaty Application No. PCT/CN2021/101579, dated Feb. 25, 2022, 9 pages.

"Discussion on the Security for Small Data Transmission", 3GPP TSG-RAN WG2 Meeting #112-electronic, R2-2008958, Agenda Item: 8.6.2, vivo, Nov. 2-13, 2020, 3 pages.

"Security aspects for SDT", 3GPP TSG-RAN WG2 Meeting #112-e, R2-2008992, Agenda item: 8.6.2, Intel Corporation, Nov. 2-13, 2020, 3 pages.

Extended European Search Report received for corresponding European Patent Application No. 21946350.2, dated Jun. 24, 2025, 12 pages.

Partial European Search Report received for corresponding European Patent Application No. 21946350.2, dated Mar. 31, 2025, 12 pages.

Office action received for corresponding Indian Patent Application No. 202347085205, dated Nov. 18, 2025, 6 pages.

* cited by examiner

300

310
PERFORM AN INITIAL TRANSMISSION TO THE SECOND DEVICE DURING AN SDT

320
RECEIVE, FROM THE SECOND DEVICE, DATA SUBSEQUENT TO THE INITIAL TRANSMISSION DURING THE SDT

330
BUFFER THE DATA

340
IN ACCORDANCE WITH A DETERMINATION THAT FIRST SECURITY VERIFICATION OF THE DATA IS SUCCESSFUL, HANDLE THE BUFFERED DATA

600

DATA HANDLING DURING SDT

RELATED APPLICATION

This application was originally filed as PCT Application No. PCT/CN2021/101579, filed on Jun. 22, 2021, of which is incorporated herein by reference in its entirety.

FIELD

Embodiments of the present disclosure generally relate to the field of telecommunication and in particular, to devices, methods, apparatuses and computer readable storage media for handling data during small data transmission (SDT).

BACKGROUND

New radio (NR) supports SDT in an inactive state to avoid the signaling overhead and delay associated with transition from the inactive state to a connected state to perform data transfer.

Multiple downlink (DL) packets may be transmitted from a network device to a terminal device as part of the same SDT procedure without transitioning to the connected state. Such multiple DL transmissions may be scheduled before DL radio resource control (RRC) message is transmitted which in turn may be used for security verification. This might be a possible security threat because a hostile network device can schedule multiple DL transmissions and the terminal device will be stuck.

SUMMARY

In general, example embodiments of the present disclosure provide a solution for handling data during SDT.

In a first aspect, there is provided a first device. The first device comprises at least one processor; and at least one memory including computer program codes; the at least one memory and the computer program codes are configured to, with the at least one processor, cause the first device in an inactive state to: perform an initial transmission to a second device during a small data transmission procedure; receive, from the second device, data subsequent to the initial transmission during the small data transmission procedure; buffer the data; and in accordance with a determination that security verification is successful, handle the buffered data.

In a second aspect, there is provided a method implemented at a first device. The method comprises: performing, at the first device, an initial transmission to a second device during a small data transmission procedure; receiving, from the second device, data subsequent to the initial transmission during the small data transmission procedure; buffering the data; and in accordance with a determination that security verification is successful, handling the buffered data.

In a third aspect, there is provided an apparatus comprising: means for performing an initial transmission to a second device during a small data transmission procedure; means for receiving, from the second device, data subsequent to the initial transmission during the small data transmission procedure; means for buffering the data; and in accordance with a determination that security verification is successful, means for handling the buffered data.

In a fourth aspect, there is provided a non-transitory computer readable medium comprising a computer program for causing an apparatus to perform at least the method according to the above second aspect.

In a fifth aspect, there is provided a first device. The first device comprises at least one processor; and at least one memory including computer program codes; the at least one memory and the computer program codes are configured to, with the at least one processor, cause the first device in an inactive state to: receive, from a second device, configuration information indicating that security verification is enabled for at least one radio bearer for small data transmission; receive, from the second device, the small data transmission associated with the at least one radio bearer; and perform the security verification.

In a sixth aspect, there is provided a method implemented at a first device. The method comprises: receiving, at a first device and from a second device, configuration information indicating that security verification is enabled for at least one radio bearer for small data transmission; and receiving, from the second device, the small data transmission associated with the at least one radio bearer; and performing the security verification.

In a seventh aspect, there is provided an apparatus comprising: means for receiving, at a first device and from a second device, configuration information indicating that security verification is enabled for at least one radio bearer for small data transmission; and means for receiving, from the second device, the small data transmission associated with the at least one radio bearer; and means for performing the security verification.

In an eighth aspect, there is provided a non-transitory computer readable medium comprising a computer program for causing an apparatus to perform at least the method according to the above sixth aspect.

In a ninth aspect, there is provided a second device. The second device comprises at least one processor; and at least one memory including computer program codes; the at least one memory and the computer program codes are configured to, with the at least one processor, cause the second device to: transmit, to a first device in an inactive state, configuration information indicating that security verification is enabled for at least one radio bearer for small data transmission; and transmit, to the first device, the small data transmission associated with the at least one radio bearer.

In a tenth aspect, there is provided a method implemented at a second device. The method comprises: transmitting, from the second device to a first device in an inactive state, configuration information indicating that security verification is enabled for at least one radio bearer for small data transmission; and transmitting, to the first device, the small data transmission associated with the at least one radio bearer.

In an eleventh aspect, there is provided an apparatus comprising: means for transmitting, from the second device to a first device in an inactive state, configuration information indicating that security verification is enabled for at least one radio bearer for small data transmission; and means for transmitting, to the first device, the small data transmission associated with the at least one radio bearer.

In a twelfth aspect, there is provided a non-transitory computer readable medium comprising a computer program for causing an apparatus to perform at least the method according to the above tenth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
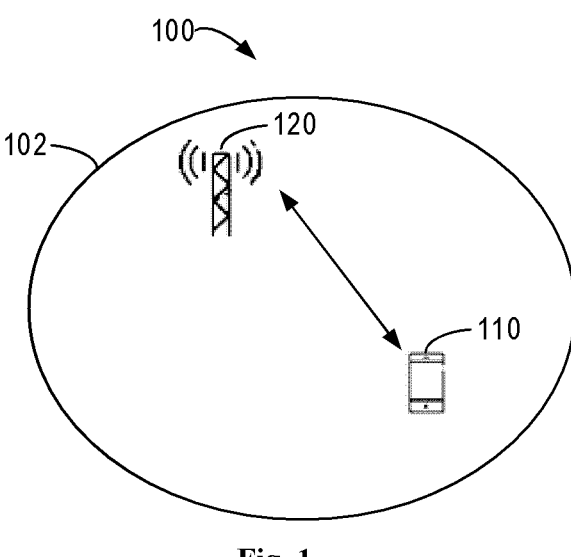
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), Integraged Access and Backhaul node, a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (loT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. The network 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) or NR and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In some embodiments, the first device 110 may be in an inactive state and configured with SDT. In the inactive state, the first device 110 may perform SDT to the second device 120. Examples of SDT traffic may relate to smartphone applications or non-smartphone applications. The smartphone applications may relate to at least one of the following: traffic from Instant Messaging (IM) services (such as whatsapp, QQ, wechat and so on), heart-beat or keep-alive traffic from IM or email clients and other applications, or push notifications from various applications. The non-smartphone applications may relate to at least one of the following: traffic from wearables (such as periodic positioning information), sensors (Industrial Wireless Sensor Networks transmitting temperature, pressure readings periodically or in an event triggered manner and so on), or smart meters and smart meter networks sending periodic meter readings.

In some embodiments, in the case where Timing Advance for the first device 110 is valid, the first device 110 may perform the SDT on resources pre-configured by the second device 120. In other words, the first device 110 may perform the SDT by reusing the configured grant (CG) type 1 resources in the inactive state. Hereinafter, the CG type 1 resources are also referred to as CG resources. The second device 120 may pre-configure such CG resources for the first device 110 by using a dedicated signaling or a broadcast signaling. Examples of the CG resources may include, but are not limited to resources on a physical uplink shared channel (PUSCH).

In other embodiments, the first device 110 may perform the SDT by performing a random access (RA) procedure. In some embodiments, the RA procedure may be an RA procedure comprising two steps (also referred to as 2-step RACH). In such embodiments, the first device 110 may transmit small data for the SDT in a message A (MSGA) of the 2-step RACH. In other embodiments, the RA procedure may be an RA procedure comprising four steps (also referred to as 4-step RACH). In such embodiments, the first device 110 may transmit small data for the SDT in a message 3 (MSG3) of the 4-step RACH.

During an SDT procedure, transmission of the first (i.e., initial) data packet is referred to as an initial transmission. In some embodiments, the initial transmission may be performed during a random access procedure. For example, the data packet may be transmitted in MSGA or MSG3. In other embodiments, the data packet may be transmitted on a grant pre-configured by the second device 120.

When the first device 110 is in the inactive state, subsequent to the initial transmission, at least one transmission to the first device 110 may be performed by the second device 120 without transitioning to a connected state. Hereinafter, the transmission subsequent to the initial transmission is also referred to as subsequent transmission. It may be understood that the initial transmission and the subsequent transmission are included in the same SDT procedure. The subsequent transmission is beneficial because the size of the MSG3 may be limited, or to avoid another SDT procedure when new data arrives right after or soon after the initial transmission. It also allows the data for the subsequent transmission to be segmented and to be transmitted over multiple transport blocks (TBs) if the size of packet data convergence protocol (PDCP) service data unit (SDU) is too large to fit in one TB.

The subsequent transmission is scheduled before an RRC message is transmitted to the first device 110. The RRC message may be used for security verification. This is possible security threat because a hostile network device can schedule DL subsequent transmissions to a terminal device and the terminal device will be stuck. In legacy, it is impossible to receive data on data radio bearer (DRBs) before DL RRC messages for RRC connection setup or RRC resume procedure are received.

In order to solve the above technical problems and potentially other technical problems in conventional solutions, embodiments of the present disclosure provide a solution for handling data during subsequent transmission. In some embodiments, upon receiving data subsequent to an initial transmission, a first device will not handle the data until security verification is successful. In this way, the data during subsequent transmission is handled in more secure manner.

Figure 2:
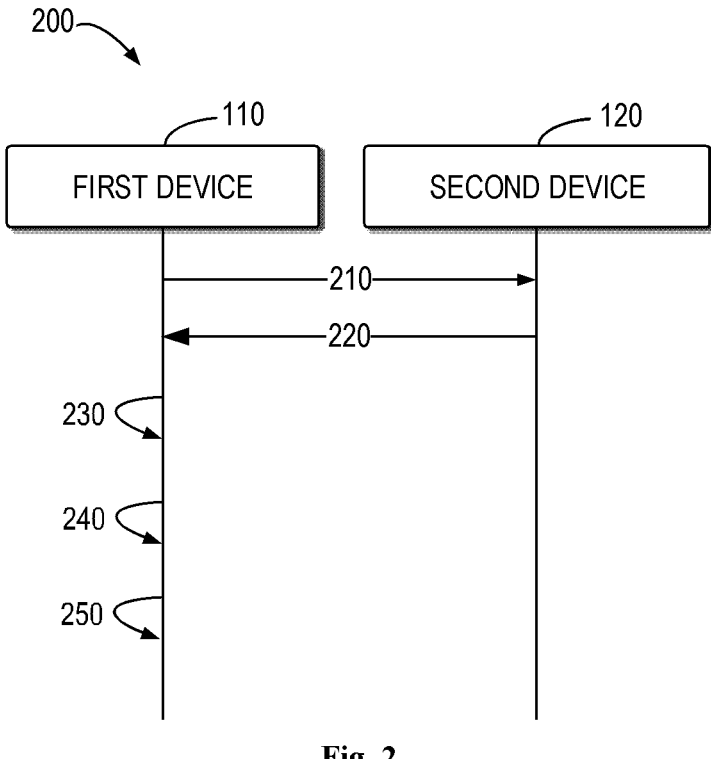
FIG. 2 illustrates a signaling chart illustrating a process for handling data during SDT according to some example embodiments of the present disclosure.

Reference is now made to FIG. 2, which shows a signaling chart illustrating a process 200 for handling data during subsequent transmission according to some example embodiments of the present disclosure. For the purpose of discussion, the process 200 will be described with reference to FIG. 1. The process 200 may involve the first device 110 and the second device 120 as illustrated in FIG. 1. Although the process 200 has been described in the communication network 100 of FIG. 1, this process may be likewise applied to other communication scenarios. Although data handling by the first device 110 is discussed, a similar process can be applied to the second device.

In the process 200, the first device 110 is in an inactive state and configured with SDT. As shown, when data suitable for SDT becomes available for transmission, the first device 110 performs 210 an initial transmission to the second device 120 during an SDT.

In some embodiments, before performing the initial transmission to the second device 120, the first device 110 may transmit a request for the initial transmission to the second device 120. Alternatively, the first device 110 may transmit to the second device 120 the request for the initial transmission together with the data for the initial transmission. In some embodiments, the first device 110 may transmit the request for the initial transmission by transmitting an RRC resume request for SDT.

Following the initial transmission or subsequent to the initial transmission, the second device 120 may have data available for transmission to the first device 110. As such, the second device 120 transmits 220 to the first device 110 the data subsequent to the initial transmission during the SDT. In some embodiments, the data may be associated with a first radio bearer (RB) configured for SDT. In other words, the second device 120 may transmit 220 the data on the first RB. Accordingly, the first device 110 may receive the data on the first RB. In some embodiments, security verification is disabled for the first RB. In other words, the first RB is not configured with security verification.

Examples of the first RB may include, but are not limited to data radio bearer (DRB) and signaling radio bearer (SRB). Examples of the SRB may include, but are not limited to SRB1, SRB2 and SRB3.

Upon receiving the data subsequent to the initial transmission, the first device 110 buffers 230 the data. In some embodiments, the data may be buffered at a first communication protocol layer. Examples of the first communication protocol layer may include, but are not limited to a physical (PHY) layer, a medium access control (MAC) layer, a radio link control (RLC) layer, a PDCP layer, or a service data adaptation protocol (SDAP) layer.

With continued reference to FIG. 2, the first device 110 determines 240 whether security verification is successful.

In some embodiments, the security verification may include, but are not limited to integrity protection verification of access stratum (AS) and ciphering verification of AS. RRC layer may handle the configuration of the AS security parameters which are part of the AS configuration. The examples of the AS security parameters may include, but are not limited to the integrity protection algorithm, the ciphering algorithm, if integrity protection and/or ciphering is enabled for a DRB and two parameters, namely the keySetChangeIndicator and the nextHopChainingCount. The first device 110 may use the AS security parameters to determine the AS security keys upon RRC connection resume.

The integrity protection algorithm is common for SRB1, SRB2, SRB3 (if configured) and DRBs configured with integrity protection, with the same keyToUse value. The ciphering algorithm is also common for SRB1, SRB2, SRB3 (if configured) and DRBs configured with the same keyToUse value.

In some embodiments, if the first device 110 successfully receives from the second device 120 a response to the request for the initial transmission, the first device 110 may determine that the security verification is successful. In some embodiments, the first device 110 may receive the response by receiving an RRC message. For example, the RRC message may comprise an RRC Release message indicating that the first device 110 shall maintain the inactive state.

In some embodiments, after receiving the data on the first RB, the first device 110 may receive further data on a second RB from the second device 120. The second RB is different from the first RB. For example, in case where the first RB is DRB1, the second RB may be any of DRB2, SRB1, SRB2 and SRB3. Security verification is enabled for the second RB. In other words, the second RB is configured with security verification. Examples of the second RB may include, but are not limited to DRB and SRB.

If the first device 110 determines that a security verification of the further data is successful, the first device 110 may determine that the second device 120 is a genuine device. As such, the first device 110 may handle the buffered data.

In some embodiments, the data may be buffered at the first communication protocol layer and the security verification may be performed at a second communication protocol layer of the first device 110. The second communication protocol layer is higher than the first communication protocol layer. In such embodiments, upon determining that the security verification is successful, the second communication protocol layer may provide the first communication protocol layer with an indication that the security verification is successful. For example, in case where the data may be buffered at one of PHY layer, MAC layer and RLC layer and the security verification is performed at PDCP layer, the PDCP layer may provide the one of PHY layer, MAC layer and RLC layer with the indication that the security verification is successful.

If the security verification is successful, the first device 110 handles 250 the buffered data. In some embodiments, the first device 110 may handle the buffered data by forwarding the buffered data from the first communication protocol layer to the second communication protocol layer higher than the first communication protocol layer. In other words, the data will not be forwarded to upper layers until the security verification is successful.

On the other hand, if the security verification fails, the first device 110 may discard the data. In such a case, the first device 110 may initiate a procedure for going into RRC_IDLE or remains in RRC_INACTIVE mode.

It will be understood that once the security verification is successful, security verification of other data received on the first RB will not be needed. In such a case, upon receiving other data on the first RB, the first device 110 may handle the other data immediately. For example, the first device 110 may forward the other data from a lower layer to an upper layer immediately.

With the embodiments of the present disclosure, the data during subsequent transmission is handled in more secure manner. Possible corrupted DL data is not forwarded to upper layers of a terminal device. Thus, user can be protected from an attack.

Figure 3:
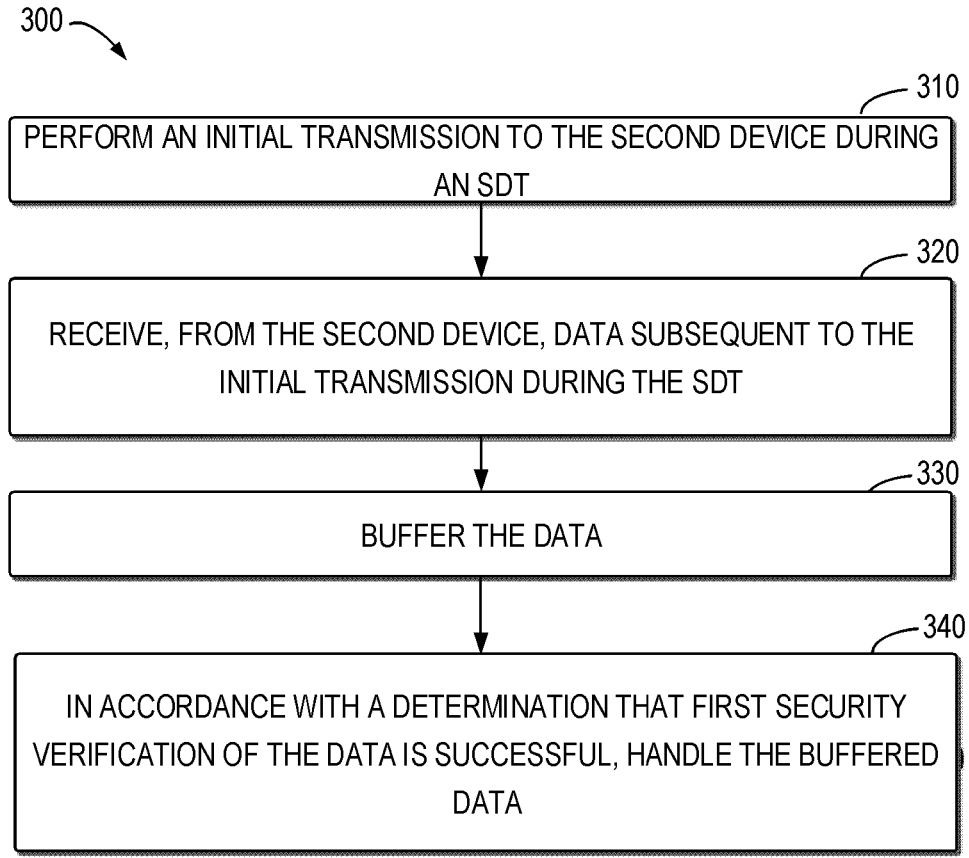
FIG. 3 illustrates a flowchart of a method implemented at a first device according to some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 with reference to FIG. 1. It would be appreciated that the method 300 may also be implemented at the second device 120 in FIG. 1.

At block 310, the first device 110 in an inactive state performs an initial transmission to the second device 120 during an SDT. At block 320, the first device 110 receives, from the second device 120, data subsequent to the initial transmission during the SDT.

At block 330, the first device 110 buffers the data. At block 340, the first device 110 handles the buffered data in accordance with a determination that security verification is successful.

In some example embodiments, the data is associated with a first RB for which the security verification is disabled.

In some example embodiments, the first RB comprises one of the following: a DRB, or an SRB.

In some example embodiments, the at least one memory and the computer program code are configured to, with the at least one processor, further cause the first device 110 to determine that the security verification is successful by:

transmitting a request for the initial transmission to the second device 120; and successfully receiving a response to the request from the second device 120.

In some example embodiments, the request comprises a radio resource control resume request for SDT, and the response comprises a radio resource control release message.

In some example embodiments, the at least one memory and the computer program code are configured to, with the at least one processor, further cause the first device 110 to: receive, from the second device 120, further data associated with a RB for which security verification of the further data is enabled; and in accordance with a determination that the security verification is successful, determine that the security verification is successful.

In some example embodiments, the second RB comprises one of the following: a DRB, or an SRB.

In some example embodiments, the at least one memory and the computer program code are configured to, with the at least one processor, cause the first device 110 to handle the buffered data by: forwarding the buffered data from a first communication protocol layer of the first device 110 to a second communication protocol layer of the first device 110, the second communication protocol layer being higher than the first communication protocol layer.

In some example embodiments, the first communication protocol layer comprises one of the following: a physical layer, a medium access control layer, a radio link control layer, a packet data convergence protocol layer, or a service data adaptation protocol layer.

In some example embodiments, the first device 110 is a terminal device and the second device 120 is a network device.

In some embodiments, RBs that are allowed to use SDT are required to always be configured with security verification so that the first device 110 may perform security verification on RBs immediately. This will be described with reference to FIGS. 4 and 5.

Figure 4:
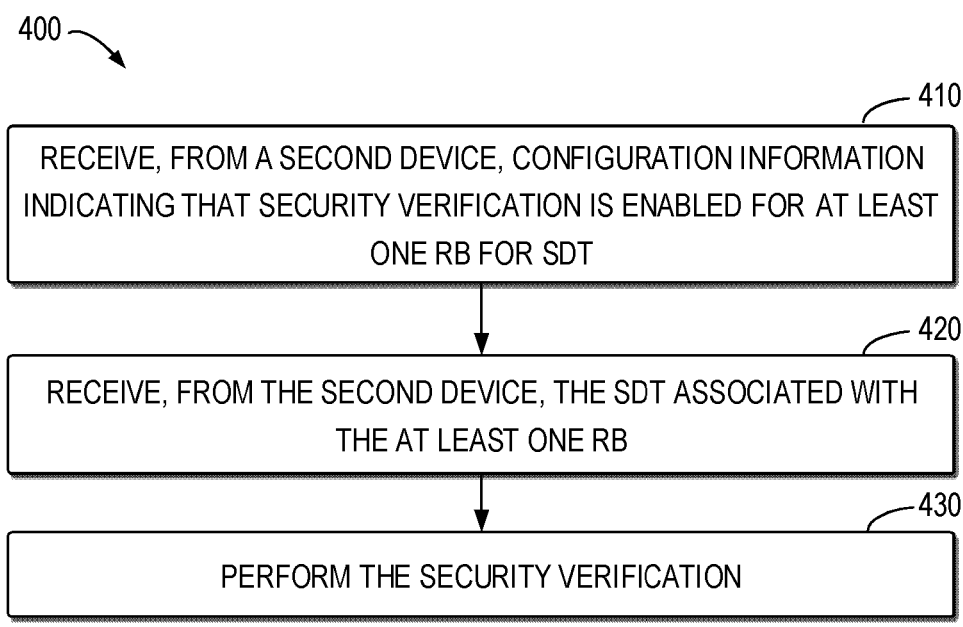
FIG. 4 illustrates a flowchart of a method implemented at a first device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device 110 with reference to FIG. 1. It would be appreciated that the method 400 may also be implemented at the second device 120 in FIG. 1.

At block 410, the first device 110 in an inactive state receives, from the second device 120, configuration information indicating that security verification is enabled for at least one RB for SDT.

At block 420, the first device 110 receives, from the second device 120, the SDT associated with the at least one RB.

At block 430, the first device 110 performs the security verification.

In some embodiments, the RB may be a DRB or an SRB.

In some embodiments, the first device 110 is a terminal device and the second device 120 is a network device.

Figure 5:
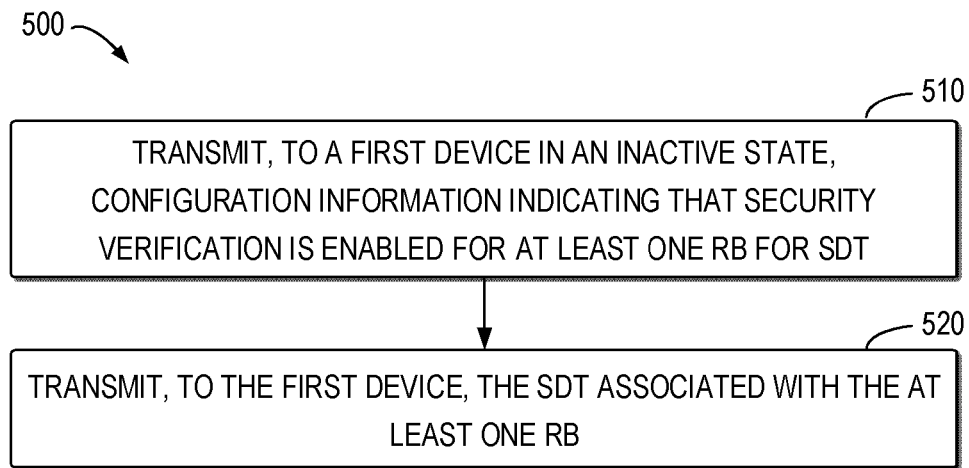
FIG. 5 illustrates a flowchart of a method implemented at a first device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 with reference to FIG. 1. It would be appreciated that the method 500 may also be implemented at the first device 110 in FIG. 1.

At block 510, the second device 120 transmits, to the first device 110 in an inactive state, configuration information indicating that security verification is enabled for at least one RB for SDT.

At block 520, the second device 120 transmits, to the first device 110 the SDT associated with the at least one RB.

In some embodiments, the RB may be a DRB or an SRB.

In some embodiments, the first device 110 is a terminal device and the second device 120 is a network device.

In some example embodiments, an apparatus capable of performing any of the method 300 (for example, the first device 110) may comprise means for performing the respective steps of the method 300. The means may be implemented in any suitable form. For example, the means may be implemented in a circuitry or software module.

In some example embodiments, the apparatus comprises: means for performing, at a first device, an initial transmission to a second device during an SDT; means for receiving, from the second device, data subsequent to the initial transmission during the SDT; means for buffering the data; and in accordance with a determination that security verification is successful, means for handling the buffered data.

In some example embodiments, the data is associated with a first RB for which the security verification is disabled.

In some example embodiments, the first RB comprises one of the following: a DRB, or an SRB.

In some example embodiments, the apparatus further comprises means for determining that the security verification is successful by: transmitting a request for the initial transmission to the second device; and successfully receiving a response to the request from the second device.

In some example embodiments, the request comprises a radio resource control resume request for SDT, and the response comprises a radio resource control release message.

In some example embodiments, the apparatus further comprises means for receiving, from the second device, further data associated with a RB for which security verification of the further data is enabled; and in accordance with a determination that the security verification is successful, means for determining that the security verification is successful.

In some example embodiments, the second RB comprises one of the following: a DRB, or an SRB.

In some example embodiments, means for handling the buffered data comprises: means for forwarding the buffered data from a first communication protocol layer of the first device to a second communication protocol layer of the first device, the second communication protocol layer being higher than the first communication protocol layer.

In some example embodiments, the first communication protocol layer comprises one of the following: a physical layer, a medium access control layer, a radio link control layer, a packet data convergence protocol layer, or a service data adaptation protocol layer.

In some example embodiments, the first device is a terminal device and the second device is a network device.

In some example embodiments, an apparatus capable of performing any of the method 400 (for example, the first device 110) may comprise means for performing the respective steps of the method 400. The means may be implemented in any suitable form. For example, the means may be implemented in a circuitry or software module.

In some example embodiments, the apparatus comprises: means for receiving, at a first device and from a second device, configuration information indicating that security verification is enabled for at least one radio bearer for small data transmission; and means for receiving, from the second device, the small data transmission associated with the at least one radio bearer; and means for performing the security verification.

In some example embodiments, the first device is a terminal device and the second device is a network device.

In some example embodiments, an apparatus capable of performing any of the method 500 (for example, the second device 120) may comprise means for performing the respective steps of the method 500. The means may be implemented in any suitable form. For example, the means may be implemented in a circuitry or software module.

In some example embodiments, the apparatus comprises: means for transmitting, from the second device to a first device in an inactive state, configuration information indicating that security verification is enabled for at least one radio bearer for small data transmission; and means for transmitting, to the first device, the small data transmission associated with the at least one radio bearer.

In some example embodiments, the first device is a terminal device and the second device is a network device.

Figure 6:
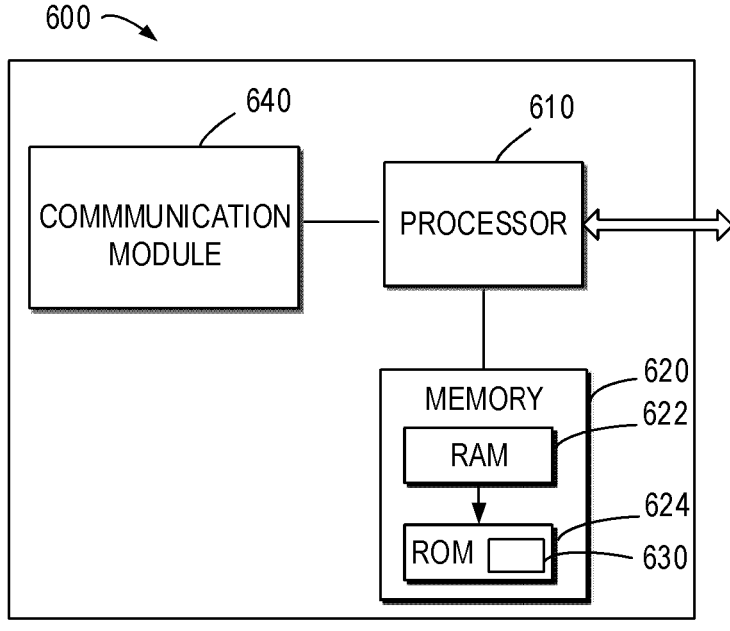
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
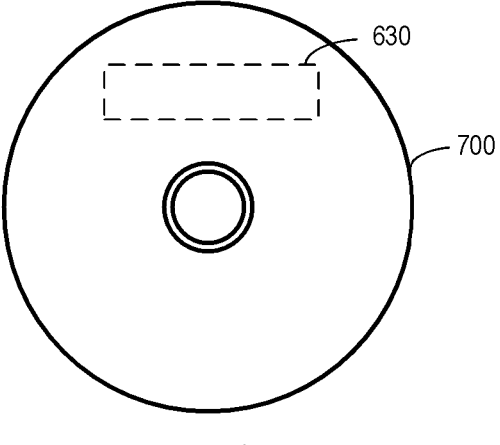
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 500 as described above with reference to FIGS. 3-5. Generally, program modules include routines, programs, libraries, objects, classes, components, data structures, or the like that perform particular tasks or implement particular abstract data types. The functionality of the program modules may be combined or split between program modules s as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:

at least one processor; and at least one memory comprising computer-executable instructions that, when executed by the at least one processor, cause the first device to perform the following operations:

performing an initial transmission comprising a packet data convergence protocol (PDCP) service data unit (SDU) in a message 3 (MSG3) of a four-step random access (RA) procedure to a second device that is a next generation NodeB (gNB) during a small data transmission procedure;

receiving, from the second device on a data radio bearer (DRB1) for which security verification is disabled, data subsequent to the initial transmission during the small data transmission procedure, wherein the DRB1 comprises one of the following: a data radio bearer or a signaling radio bearer;

receiving, from the second device, additional data on a second data radio bearer (DRB2) that is different from the DRB1, the second radio bearer being configured with security verification;

confirming the second device is genuine based on the security verification of the further data;

based on the confirming, buffering the data at a radio link control (RLC) layer of the first device;

determining that integrity protection verification and ciphering verification of access stratum (AS) security parameters are successful based on receipt of a radio resource control (RRC) release message indicating maintenance of the RRC inactive state; and based on the determination that integrity protection verification and ciphering verification of the AS security parameters are successful based on receipt of the RRC release message indicating maintenance of the RRC inactive state, handling the buffered data by forwarding the buffered data from the RLC layer to a packet data convergence protocol (PDCP) layer of the first device, the PDCP layer providing an indication to the RLC layer based on verification being successful.

2. The first device of claim 1, wherein the request comprises a radio resource control resume request for small data transmission, and the response comprises a radio resource control message.

3. The first device of claim 2, wherein the data received on the DRB1 is segmented across multiple transport blocks based on the PDCP service data unit (SDU) being too large to fit into one transport block.

4. The first device of claim 3, wherein the first device is a terminal device.

5. A system comprising:
a first device;
at least one processor; and
at least one memory comprising computer-executable instructions that, when executed by the at least one processor, cause the first device to perform the following operations:
  performing an initial transmission comprising a packet data convergence protocol (PDCP) service data unit (SDU) in a message 3 (MSG3) of a four-step random access (RA) procedure to a second device that is a next generation NodeB (gNB) during a small data transmission procedure;
  receiving, from the second device on a data radio bearer (DRB1) for which security verification is disabled, data subsequent to the initial transmission during the small data transmission procedure, wherein the DRB1 comprises one of the following: a data radio bearer or a signaling radio bearer;
  receiving, from the second device, additional data on a second data radio bearer (DRB2) that is different from the DRB1, the second radio bearer being configured with security verification;
  confirming the second device is genuine based on the security verification of the further data;
  based on the confirming, buffering the data at a radio link control (RLC) layer of the first device;
  determining that integrity protection verification and ciphering verification of access stratum (AS) security parameters are successful based on receipt of a radio resource control (RRC) release message indicating maintenance of the RRC inactive state; and
  based on the determination that integrity protection verification and ciphering verification of the AS security parameters are successful based on receipt of the RRC release message indicating maintenance of the RRC inactive state, handling the buffered data by forwarding the buffered data from the RLC layer to a packet data convergence protocol (PDCP) layer of the first device, the PDCP layer providing an indication to the RLC layer based on verification being successful.

6. The system of claim 5, wherein the request comprises a radio resource control resume request for small data transmission, and the response comprises a radio resource control message.

7. The system of claim 6, wherein the data received on the DRB1 is segmented across multiple transport blocks based on the PDCP service data unit (SDU) being too large to fit into one transport block.

8. The system of claim 7, wherein the first device is a terminal device.

9. A method performed by a first device, the method comprising:
  performing an initial transmission comprising a packet data convergence protocol (PDCP) service data unit (SDU) in a message 3 (MSG3) of a four-step random access (RA) procedure to a second device that is a next generation NodeB (gNB) during a small data transmission procedure;
  receiving, from the second device on a data radio bearer (DRB1) for which security verification is disabled, data subsequent to the initial transmission during the small data transmission procedure, wherein the DRB1 comprises one of the following: a data radio bearer or a signaling radio bearer;
  receiving, from the second device, additional data on a second data radio bearer (DRB2) that is different from the DRB1, the second radio bearer being configured with security verification;
  confirming the second device is genuine based on the security verification of the further data;
  based on the confirming, buffering the data at a radio link control (RLC) layer of the first device;
  determining that integrity protection verification and ciphering verification of access stratum (AS) security parameters are successful based on receipt of a radio resource control (RRC) release message indicating maintenance of the RRC inactive state; and
  based on the determination that integrity protection verification and ciphering verification of the AS security parameters are successful based on receipt of the RRC release message indicating maintenance of the RRC inactive state, handling the buffered data by forwarding the buffered data from the RLC layer to a packet data convergence protocol (PDCP) layer of the first device, the PDCP layer providing an indication to the RLC layer based on verification being successful.

10. The method 9, wherein the request comprises a radio resource control resume request for small data transmission, and the response comprises a radio resource control message.

11. The method of claim 10, wherein the data received on the DRB1 is segmented across multiple transport blocks based on the PDCP service data unit (SDU) being too large to fit into one transport block.

* * * * *